United States Patent
Yang et al.

(10) Patent No.: US 11,339,315 B2
(45) Date of Patent: May 24, 2022

(54) NON-COMBUSTIBLE MIXED REFRIGERANT HAVING LOW GREENHOUSE EFFECT AND APPLICATION THEREOF

(71) Applicant: JIANGXI TIANYU CHEMICAL CO., LTD., Jiangxi (CN)

(72) Inventors: Xi Yang, Jiangxi (CN); Xiaori Yue, Jiangxi (CN)

(73) Assignee: JIANGXI TIANYU CHEMICAL CO., LTD., Jiangxi (CN)

( * ) Notice: Subject to any disclaimer, the term of this patent is extended or adjusted under 35 U.S.C. 154(b) by 0 days.

(21) Appl. No.: 17/155,867

(22) Filed: Jan. 22, 2021

(65) Prior Publication Data

US 2021/0139759 A1    May 13, 2021

Related U.S. Application Data

(63) Continuation of application No. 16/609,327, filed as application No. PCT/CN2019/070570 on Jan. 7, 2019, now Pat. No. 10,899,951.

(30) Foreign Application Priority Data

Apr. 2, 2018   (CN) .......................... 201810282003.7

(51) Int. Cl.
  *C09K 5/04*   (2006.01)
  *C08J 9/14*   (2006.01)
  *C09K 3/30*   (2006.01)
  *F25B 31/00*  (2006.01)

(52) U.S. Cl.
  CPC ............... *C09K 5/045* (2013.01); *C08J 9/146* (2013.01); *C09K 3/30* (2013.01); *F25B 31/004* (2013.01); *C08J 2203/142* (2013.01); *C08J 2203/162* (2013.01); *C08J 2203/202* (2013.01); *C09K 2205/122* (2013.01); *C09K 2205/126* (2013.01); *C09K 2205/22* (2013.01); *C09K 2205/32* (2013.01)

(58) Field of Classification Search
  CPC .......... C09K 2205/126; C09K 2205/22; C09K 5/045; C09K 2205/40
  See application file for complete search history.

(56) References Cited

U.S. PATENT DOCUMENTS

| | | | |
|---|---|---|---|
| 10,899,951 B2 * | 1/2021 | Yang | ............... C10M 141/04 |
| 2009/0120619 A1 | 5/2009 | Sievert et al. | |
| 2014/0223927 A1 | 8/2014 | Pottker et al. | |
| 2016/0017199 A1 | 1/2016 | Yana Motta et al. | |

FOREIGN PATENT DOCUMENTS

| | | |
|---|---|---|
| CN | 101688817 | 3/2010 |
| CN | 104105775 A | 10/2014 |
| CN | 105189691 | 12/2015 |
| CN | 105333653 | 2/2016 |
| CN | 106687556 A | 5/2017 |
| CN | 107076466 | 8/2017 |
| CN | 107257836 | 10/2017 |
| CN | 107532073 A | 1/2018 |
| CN | 107746703 | 3/2018 |
| WO | 2009/047535 A2 | 4/2009 |
| WO | 2012/151238 A2 | 11/2012 |

OTHER PUBLICATIONS

International Search Report issued in related PCT Application No. PCT/CN2019/070570, dated Mar. 28, 2019.
J.B. Burkholder et al., World Meteorlogical Organization Global Ozone Research and Monitoring Project-Report No. 58 ((Scientific Assessment of Ozone Depletion: 2018)) Appendix A, No month, (Year: 2018).
Office Action issued by the Chinese Patent Office for application No. 201810282003.7, dated Aug. 21, 2020.

* cited by examiner

*Primary Examiner* — John R Hardee
(74) *Attorney, Agent, or Firm* — Barnes & Thornburg LLP; Jeffrey R. Stone

(57) ABSTRACT

A non-combustible mixed refrigerant having a low greenhouse effect and an application thereof, the mixed refrigerant comprises the following components in mass fractions: 4-31.5% of R125, 50-80% of R1234ze (E) and 12-22% of R1234yf. Under the cooperation of each component dosage range, the mixed refrigerant becomes non-combustible, the ODP is 0, and the GWP is not greater than 1000. The present invention may be used in a refrigeration system, does not destruct ozone, reduces the greenhouse effect, and has a low slip temperature, relating to ternary azeotropic or near-azeotropic refrigerants, and being beneficial for the stable operation of a refrigeration system. The mixed refrigerant may also be used as a foaming agent or an aerosol propellant, and has the advantages of being non-combustible, having a low ozone destruction index, and being environmentally friendly, safe and reliable.

15 Claims, No Drawings

NON-COMBUSTIBLE MIXED REFRIGERANT HAVING LOW GREENHOUSE EFFECT AND APPLICATION THEREOF

CROSS-REFERENCE TO RELATED APPLICATIONS

The present application is a continuation of U.S. application Ser. No. 16/609,327, filed Oct. 29, 2019 and titled NON-COMBUSTIBLE MIXED REFRIGERANT HAVING LOW GREENHOUSE EFFECT AND APPLICATION THEREOF which is a National Stage Entry of PCT/CN2019/070570, filed Jan. 7, 2019, and titled NON-COMBUSTIBLE MIXED REFRIGERANT HAVING LOW GREENHOUSE EFFECT AND APPLICATION THEREOF, the entire contents of which are incorporated herein by reference.

TECHNICAL FIELD

The present disclosure belongs to the technical field of refrigerants, and relates to a mixed refrigerant and use thereof, and particularly relates to a mixed refrigerant which is non-flammable and has a low greenhouse effect, and use thereof.

BACKGROUND

The increasing concerns about environmental protection have accelerated the phase-out pace of chlorofluorocarbons (CFCs) and hydrochlorofluorocarbons (HCFCs). At present, there are two alternatives: Germany and some countries in northern Europe advocate the use of natural working fluids such as $CO_2$, $NH_3$ and HCs; the United States and Japan advocate the use of synthetic hydrofluorocarbons (HFCs), such as R134a, R410A and R407C etc. Honeywell and DuPont have developed new refrigerant hydrofluoroolefins (HFOs), such as R1234yf, R1234ze and so on. Due to the high GWP (global warming potential) of HFCs, the Kigali Amendment to the 28th Meeting of the Montreal Protocol brought out a gradual reduction plan for HFCs. At present, R1234yf or $CO_2$ has been used in automotive air conditioners to replace the original R134a. Although HFO refrigerants have a low GWP, they are currently only used in automotive air conditioners due to flammability problems. The $CO_2$ pressure on the high pressure side of the transcritical cycle is about 12 MPa, which requires a high pressure resistant system, so the $CO_2$ application is greatly limited.

According to the latest EU F-gas regulations: by 2015, household freezing/cooling equipment will be prohibited from using refrigerants with a GWP $\geq$ 150; by 2020, fully enclosed commercial freezing/cooling equipment will be prohibited from using refrigerants with a GWP $\geq$ 2500, and by 2022, the same will be prohibited from using refrigerants with a GWP $\geq$ 150; by 2020, stationary refrigeration equipment (excluding equipment that are designed to cool products to temperatures below −50° C.) will be prohibited from using refrigerants with a GWP $\geq$ 2500; by 2022, commercial centralized refrigeration systems with a cooling capacity of greater than 40 kW will be prohibited from using refrigerants with a GWP $\geq$ 150, excluding refrigerants used in the primary circulation of cascade systems, which may have a GWP of less than 1500; by 2020, fully enclosed movable space air conditioners will be prohibited from using refrigerants with a GWP $\geq$ 150; by 2025, split air conditioner charged with less than 3 kg of HFCs will be prohibited from using refrigerants with a GWP $\geq$ 750.

At present, the environmentally-friendly refrigerants on the market are mainly synthetic HFOs. U.S. Pat. No. 7,279,451 disclosed 2,3,3,3-tetrafluoropropene (HFO-1234yf) as a refrigerant which had a GWP of less than 1000, but was flammable. U.S. Pat. No. 8,318,039 disclosed a non-flammable binary mixed refrigerant R134a/HFO-1234yf which had a GWP of greater than 400. CN 105315967 A disclosed a mixed refrigerant contained, by weight percentage, 50-70% of R32, 20-30% of R1234ze and 10-20% of R125. Although the mixed refrigerant had a refrigeration capability equivalent to that of R410A, a GWP lower than that of R410A and a flammability lower than that of R32, it was still flammable.

Therefore in the art, it is necessary to develop a non-flammable refrigerant with a GWP of less than 1000 (preferably less than 400, and more preferably less than 150) to meet the requirements of the EU F-gas regulations.

SUMMARY

In view of the problems in the prior art, the object of the present disclosure is to provide a mixed refrigerant and use thereof, and in particular to provide a mixed refrigerant which is non-flammable and has a low greenhouse effect, and use thereof.

To achieve this, the present disclosure employs the following technical solutions.

The present disclosure provides a mixed refrigerant comprising, by mass fraction, 4-31.5% of R125, 50-80% of R1234ze(E) and 12-22% of R1234yf.

The mixed refrigerant of the present disclosure is a non-flammable, azeotropic or near-azeotropic, mixed refrigerant.

Preferably, the mixed refrigerant has an ozone depletion potential (ODP) of 0 and a GWP $\leq$ 1000. For example, the GWP is 1000, 950, 900, 850, 800, 700, 600, 500, 400, 300, 200, 150, 130 or 100 etc. Preferably, the mixed refrigerant has an ODP of 0 and a GWP $\leq$ 400. More preferably, the mixed refrigerant has an ODP of 0 and a GWP $\leq$ 150.

In the present disclosure, the mixed refrigerants consisting of R125, R1234yf and R1234ze(E) are ternary azeotropic or near-azeotropic mixed refrigerants. The mixed refrigerants are non-flammable, have an ODP of 0 and a low GWP. They are non-toxic, environment friendly, safe and reliable and they have a small temperature glide when used as a refrigerant.

In the mixed refrigerant of the present disclosure, the mass fraction of the R125 can be 4%, 6%, 8%, 10%, 13%, 15%, 18%, 20%, 22%, 24%, 26%, 28%, 30% or 31.5% etc; the mass fraction of R1234ze(E) can be 55%, 53%, 55%, 57%, 60%, 63%, 65%, 68%, 70%, 73%, 75%, 78%, or 80% etc; the mass fraction of R1234yf can be 12%, 14%, 16%, 18%, 19%, 20%, 21% or 22% etc. In this disclosure, if R125 content is too high, for example, up to 38%, the GWP of the mixed refrigerant will increase dramatically and will exceed 1200, which is not conducive to reducing the greenhouse effect.

In a preferred embodiment, the mixed refrigerant comprises, by mass fraction, 31.1% of R125, 55.2% of R1234ze (E), and 13.7% of R1234yf.

In another preferred embodiment, the mixed refrigerant comprises, by mass fraction, 15% of R125, 68% of R1234ze (E) and 17% of R1234yf.

In another preferred embodiment, the mixed refrigerant comprises, by mass fraction, 10% of R125, 72% of R1234ze(E) and 18% of R1234yf.

In another preferred embodiment, the mixed refrigerant comprises, by mass fraction, 4% of R125, 74% of R1234ze(E), and 22% of R1234yf.

In another preferred embodiment, the mixed refrigerant comprises, by mass fraction, 4% of R125, 76% of R1234ze(E), and 20% of R1234yf.

In the mixed refrigerant of present disclosure, it is necessary to use R1234ze(E) in combination with R125 and R1234yf to obtain the azeotropic or near-azeotropic mixed refrigerant, however, the isomer of R1234ze(E), R1234ze(Z), cannot form an azeotropic or near-azeotropic mixed refrigerant in combination with R125 and R1234yf.

The mixed refrigerant of present disclosure which has an ODP of 0 and a low GWP and is non-flammable fully meets environmental protection and safety requirements, and can be used to replace R134a, R22, R11, R245fa, R236fa, R410A, R407C, R417A, R422A, R507A, R502A and R404A etc.

In addition, according to the principle of complementary advantages, the mixed refrigerant of present disclosure can further be mixed with other refrigerants. The mixed refrigerant can further include, for example, preferably, any one selected from the group consisting of refrigerants R32, R152a, R134, R134a, R227ea, R236fa and CF3I, or a combination of at least two selected therefrom. The mixed refrigerant may be further mixed with such refrigerants to achieve better environmental protection, non-flammability and better performance etc. Compared to natural refrigerants, which are flammable and toxic and need a high pressure, the mixed refrigerants of the present disclosure are the development direction of environmentally friendly refrigerants.

However, since the HFO-based refrigerants have a C=C double bond, the stability is relatively poor, and C=C double bond polymerization occurs under extreme conditions. Therefore, preferably, the mixed refrigerant of present disclosure further comprises a stabilizer.

Preferably, the stabilizer includes, but is not limited to, one selected from the group consisting of alkyl aryl ether, lactones, thioether, nitromethane, alkyl silane, benzophenone derivatives, diethylene terephthalic acid and diphenyl-terephthalic acid, or a mixture of at least two selected therefrom.

In another aspect, the present disclosure provides use of the mixed refrigerant as described above in a refrigeration system.

The mixed refrigerant of the present disclosure can be used as a refrigerant in refrigeration, air conditioning and heat pump systems, replacing R134a, R22, R11, R245fa, R236fa, R410A, R407C, R417A, R422A, R507A, R502A and R404A etc. commonly used in these refrigeration systems.

For the use of the mixed refrigerants of present disclosure, direct infusion can be realized with little or no modification to existing equipment and production lines.

Preferably, the above-mentioned refrigeration system further comprises lubricating oil. Preferably, the lubricating oil comprises any one selected from the group consisting of natural mineral oil, polyalkylene glycol (PAG), polyol ester (POE), alkyl benzene (AB), poly-alfa olefin (PAO) or polyvinyl ether (PVE), or a mixture combination of at least two selected therefrom.

Lubricating oil is present in the form of liquid inside the compressor of the refrigeration system to lubricate the moving parts inside the compressor. In the refrigeration cycle, a portion of the lubricating oil is carried away from the compressor by the refrigerant, and carried back to the compressor when the refrigerant recycles back, which is related to the solubility of the refrigerant and lubricating oil. The higher the solubility of the refrigerant in lubricating oil, the easier the lubricating oil is brought back to the compressor. However, if the solubility of the refrigerant in the lubricating oil is too high, the viscosity of the lubricating oil will be decreased such that the moving parts of the compressor are susceptible to wear and tear. Detergents, dispersants, extreme pressure anti-wear agents, friction modifiers, antioxidants, anti-foaming agents, anti-emulsifiers, anti-oxidation and anti-corrosion agents, oil-based agents, anti-rust agents, sticky modifiers and pour point depressants are generally added to the lubricating oil to improve the lubricating oil's performance.

In another aspect, the present disclosure provides use of the mixed refrigerant as described above as a blowing agent or aerosol propellant.

The mixed refrigerants of the present disclosure can be used as foaming agents in various foaming industries or as environmentally friendly aerosol propellants. They have the advantages of non-flammability, low ozone depletion potential (ODP), safety and reliability.

Compared with the prior art, the present disclosure has the following benefits:

The combination of the amount of each component of the mixed refrigerant of present disclosure makes it non-flammable and have an ODP of 0 and a GWP of no more than 1000. The mixed refrigerant of the present disclosure can be used in refrigeration systems, causing no ozone destruction effect, reducing the greenhouse effect significantly, and having a small temperature glide. It belongs to a ternary azeotropic or near-azeotropic refrigerant, which is beneficial to the stable operation of refrigeration system. The mixed refrigerants of the present disclosure can also be used as foaming agents or aerosol propellants, and have the advantages of non-flammability, low ozone depletion potential, environmental friendliness, safety and reliability.

DETAILED DESCRIPTION

The technical solutions of present disclosure will be further illustrated by way of the following embodiments. It should be understood by those skilled in the art that these embodiments are only intended to aid the understanding of the present disclosure and should not to be considered as limitation thereto.

Example 1

In this example, a mixed refrigerant comprised, by mass fraction, 4% of R125, 76% of R1234ze(E) and 20% of R1234yf was provided.

Example 2

In this example, a mixed refrigerant comprised, by mass fraction, 4% of R125, 74% of R1234ze(E) and 22% of R1234yf was provided.

Example 3

In this example, a mixed refrigerant comprised, by mass fraction, 10% of R125, 72% of R1234ze(E) and 18% of R1234yf was provided.

Example 4

In this example, a mixed refrigerant comprised, by mass fraction, 15% of R125, 68% of R1234ze(E) and 17% of R1234yf was provided.

Example 5

In this example, a mixed refrigerant comprised, by mass fraction, 31.1% of R125, 55.2% of R1234ze(E) and 13.7% of R1234yf was provided.

Example 6

In this example, a mixed refrigerant comprised, by mass fraction, 31.5% of R125, 50% of R1234ze(E), and 18.5% of R1234yf was provided.

Example 7

In this example, a mixed refrigerant comprised, by mass fraction, 4% of R125, 80% of R1234ze(E) and 16% of R1234yf was provided.

Under the air conditioning test conditions of ARI Standard 520: evaporation temperature 7.2° C., condensation temperature 54.4° C., superheat temperature 11.1° C., undercooling temperature 8.3° C. and compressor isentropic efficiency 0.8, the environmental parameters, physical properties and thermal properties of R134a and the mixed refrigerants in Examples 1-7 were measured and results are listed in Table 1.

TABLE 1

|  | Example 1 | Example 2 | Example 3 | Example 4 | Example 5 | Example 6 | Example 7 | R134a |
|---|---|---|---|---|---|---|---|---|
| ODP | 0 | 0 | 0 | 0 | 0 | 0 | 0 | 0 |
| GWP | 127 | 127 | 317 | 476 | 986 | 999 | 127 | 1300 |
| Molecular weight (g/mol) | 114.27 | 114.27 | 114.61 | 114.9 | 115.84 | 115.86 | 114.27 | 102.03 |
| Evaporating pressure (kPa) | 301.33 | 302.24 | 333.59 | 360.66 | 447.42 | 456.28 | 299.88 | 376.84 |
| Condensing pressure (kPa) | 1113.4 | 1112.88 | 1161.66 | 1204.81 | 1367.53 | 1379.60 | 1115.79 | 1475.82 |
| Exhaust temperature (° C.) | 64.9 | 64.89 | 63.4 | 62.3 | 60.3 | 54.95 | 65.44 | 74.8 |
| Temperature glide (° C.) | 1.46 | 1.49 | 3.24 | 4.49 | 7.12 | 7.31 | 1.41 | — |
| COP* | 1.06 | 1.06 | 1.11 | 1.14 | 1.22 | 1.23 | 1.05 | 1 |
| Cooling capacity* | 0.89 | 0.89 | 0.88 | 0.87 | 0.84 | 0.83 | 0.90 | 1 |
| Volume cooling capacity* | 0.8 | 0.8 | 0.88 | 0.94 | 1.16 | 1.17 | 0.80 | 1 |

Remarks: * in Table 1 indicates a relative value compared to the corresponding value of R134a, wherein COP is Coefficient of Performance.

It can be seen from Table 1 that the mixed refrigerants as prepared in Examples 1-7 had an ODP of 0 and a GWP of less than or equal to 1000 and they belonged to azeotropic or near-azeotropic refrigerants, which were beneficial to the stable operation of the system. The evaporating pressure and condensing pressure of the mixed refrigerants were equivalent to those of R134a, and they can be directly used to replace R134a in systems without great modification. Compared with R134a, the cooling capacity and volume cooling capacity of the mixed refrigerants were both lower than those of R134a by about 10%; COP was 5-23% higher than that of R134a, and the exhaust temperature was also lower, which was beneficial to decreasing the exhaust temperature of the compressor.

The explosion limits of the mixed refrigerants in Examples 1-7, R600a (R600a was used to verify the accuracy of equipment used in the flammability test), R1234ze(E) and R1234yf were measured according to the ASHRAE 34 standard. The experiments were performed in a 12L round bottom flask. The ignition source was the induction spark between two electrodes with an alternating current of 30 mA, 15KV and a spark duration of 0.4 s. The electrodes were L-shape, made of tungsten and had a diameter of 1 mm. The two electrodes were 6.4 mm apart.

The electrodes were mounted at a height of ⅓ from the bottom of the bottle. The angle of flame propagation was determined by observation and was used to determine the flammability. If the angle between the center of the electrodes and the flame frontier on the flask wall was less than 90 degree, the refrigerant was non-flammable; if the angle was greater than 90, it was flammable. The test results are shown in Table 2, wherein LFL represents the lower flammable limit, UFL represents the upper flammable limit.

TABLE 2

| Refrigerant | LFL (v %) | UFL (v %) | Notes |
|---|---|---|---|
| R600a | 1.8 | 8.5 |  |
| R1234ze(E) | 7 | 9.5 |  |
| R1234yf | 6.2 | 12.3 |  |

TABLE 2-continued

| Refrigerant | LFL (v %) | UFL (v %) | Notes |
|---|---|---|---|
| Example 1 | NA | NA | None-flammable |
| Example 2 | NA | NA | None-flammable |
| Example 3 | NA | NA | None-flammable |
| Example 4 | NA | NA | None-flammable |
| Example 5 | NA | NA | None-flammable |
| Example 6 | NA | NA | None-flammable |
| Example 7 | NA | NA | None-flammable |

Table 2 shows that the mixed refrigerants of the this disclosure were non-flammable.

The mixed refrigerants of Examples 1-7 were charged into a pressure resistant container with an observation window. The temperature in the container was kept at 25° C. and the mixed refrigerant was in a vapor-liquid equilibrium state. The initial vapor pressure in the container was measured, and then the refrigerant in the container was discharged slowly in order to keep the temperature constant until 50% weight percent of the mixed refrigerant was discharged. At this time, a part of liquid was still present in the container. The vapor pressure was measured again.

Changes in pressure values before relief ant that after relief are shown in Table 3.

TABLE 3

| Refrigerant | Pressure before relief (kPa) | Pressure after 50% relief (kPa) | Change in pressure(%) |
|---|---|---|---|
| Example 1 | 583.3 | 560.64 | 3.9 |
| Example 2 | 588.36 | 565.67 | 3.9 |
| Example 3 | 619.1 | 580.27 | 6.3 |
| Example 4 | 652.35 | 600.27 | 8 |
| Example 5 | 768.17 | 680.22 | 11.4 |
| Example 6 | 786.61 | 700.98 | 10.9 |
| Example 8 | 572.79 | 550.54 | 3.9 |

Table 3 shows that pressure changes before and after relief were less than 12% and that the mixed refrigerants were azeotropic or near-azeotropic.

The embodiments above are used to illustrate the mixed refrigerants of the present disclosure and use thereof; however, the present disclosure is not limited to the above embodiments, and it does not mean that the present disclosure must rely on the above embodiments to be implemented. It should be understood by those skilled in the art that any improvements of the present disclosure, the equivalent replacement of the raw materials of the present disclosure, the addition of auxiliary components and the selection of specific means etc. will all fall within the scope of protection and disclosure of present disclosure.

What is claimed is:

1. A mixed refrigerant comprising, by mass fraction, 4-31.5% of R125, 50-80% of R1234ze(E) and 12-22% of R1234yf, and the mixed refrigerant further contains $CF_3I$.

2. The mixed refrigerant according to claim 1, wherein the mixed refrigerant is non-flammable and azeotropic or near-azeotropic.

3. The mixed refrigerant according to claim 1, wherein the mixed refrigerant has an ODP of 0 and a GWP $\leqslant 1000$.

4. The mixed refrigerant according to claim 1, wherein the mixed refrigerant has an ODP of 0 and a GWP $\leqslant 400$.

5. The mixed refrigerant according to claim 4, wherein the mixed refrigerant has an ODP of 0 and a GWP $\leqslant 150$.

6. The mixed refrigerant according to claim 1, wherein the mixed refrigerant further contains R32.

7. The mixed refrigerant according to claim 6, wherein the mixed refrigerant further includes a stabilizer.

8. The mixed refrigerant according to claim 7, wherein the stabilizer includes one selected from the group consisting of alkyl aryl ether, thioalcohol, lactones, thioether, nitromethane, alkylsilane, benzophenone derivatives, diethylene terephthalic acid and diphenyl terephthalic acid, or a mixture of at least two selected therefrom.

9. The mixed refrigerant according to claim 1, wherein the mixed refrigerant further includes a stabilizer.

10. The mixed refrigerant according to claim 9, wherein the stabilizer includes one selected from the group consisting of alkyl aryl ether, thioalcohol, lactones, thioether, nitromethane, alkylsilane, benzophenone derivatives, diethylene terephthalic acid and diphenyl terephthalic acid, or a mixture of at least two selected therefrom.

11. The mixed refrigerant according to claim 1, wherein the mixed refrigerant further includes a stabilizer.

12. The mixed refrigerant according to claim 11, wherein the stabilizer includes one selected from the group consisting of alkyl aryl ether, thioalcohol, lactones, thioether, nitromethane, alkylsilane, benzophenone derivatives, diethylene terephthalic acid and diphenyl terephthalic acid, or a mixture of at least two selected therefrom.

13. A refrigeration system comprising the mixed refrigerant according to claim 1, 6, 9, 7, 11, 10, 8 or 12.

14. The refrigeration system according to claim 13, wherein the refrigeration system further comprises lubricating oil.

15. The refrigeration system according to claim 14, wherein the lubricating oil comprises any one selected from the group consisting of natural mineral oil, polyalkylene glycol, polyol ester, alkyl benzene, poly-alfa olefin and polyvinyl ether, or a combination of at least two selected therefrom.

* * * * *